June 15, 1943.  H. W. KOST  2,321,755
DEVICE FOR CONNECTING SHEET METAL PANELS
Filed Aug. 5, 1939
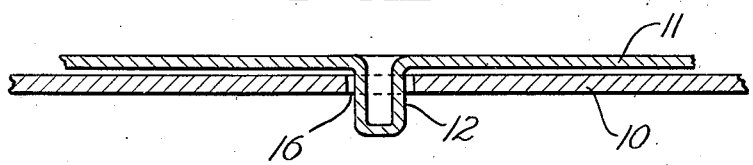
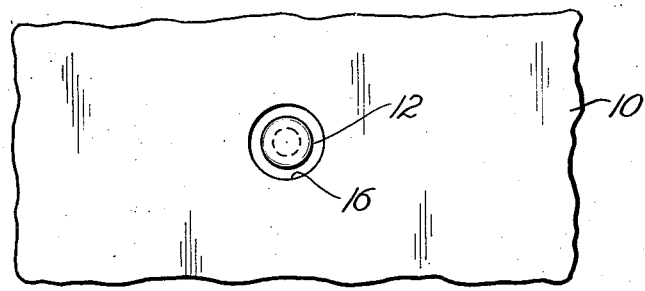
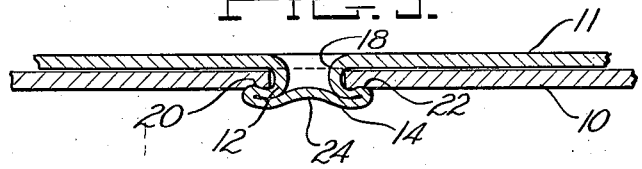
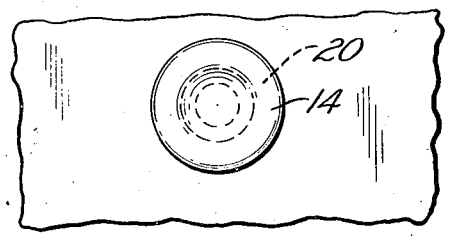
Inventor
Harold W. Kost
By Malcolm W. Fraser
Attorney Patented June 15, 1943

2,321,755

UNITED STATES PATENT OFFICE 2,321,755

DEVICE FOR CONNECTING SHEET METAL PANELS

Harold W. Kost, Birmingham, Mich., assignor to Detroit Harvester Company, Detroit, Mich., a corporation of Michigan Application August 5, 1939, Serial No. 288,606

1 Claim. (Cl. 85—40)

This invention relates to connecting means for sheet metal panels, or the like, and the method of connecting such panels to produce in effect a substantially unitary structure.

An object of the invention is to provide the panels with cooperating connection and connection-receiving means interconnected so that the use of extraneous fastening means is eliminated, the connecting means being integrally formed in one of the sheet metal elements and having a head portion flattened into impinging relation with respect to the element adapted to be connected thereto.

Another object of the invention is to produce a protuberant boss or bur on one of the panels and an aperture in another panel to receive the boss, which is clinched into positive sealing engagement with the apertured panel to form a waterproof connection between the panels.

A further object of the invention is to provide a method of connecting sheet metal panels together in accordance with the foregoing objects.

Further objects and advantages will become apparent from a study of the following description when taken in connection with the accompanying drawing, in which:

Figure 1 is a sectional view of the final steps in the method and illustrates the connecting means of the invention;

Figure 2 is a plan view of the structure shown in Figure 1;

Figure 3 is a sectional view of the connecting means and illustrates the final steps in the method; and Figure 4 is a plan view of the structure shown in Figure 3.

Referring to the drawing illustrating a practical embodiment of the present invention, and the method of preparing and forming sheet metal structures for intimate connection, 10 and 11 represent a pair of substantially flat sheet metal panels, strips, elements, blanks or the like, which are to be connected together. The elements 10 and 11 may be made of any desired metal capable of being fabricated to produce the connection of the invention.

The connecting means comprises a headed boss having a body 12 formed integrally with one of the panels and projected through an aperture in the other panel and having its head portion 14 peened over or clinched into binding engagement with the surface of the apertured panel adjacent the aperture therein to secure the panels together. The head 14 is of generally disc form and is clinched into positive sealing engagement with the surface of the panel to prevent the ingress of moisture. Thus, not only is a separate fastener eliminated, but the use of sealing washers or gaskets is also dispensed with by the present construction.

As may be seen by reference to Figures 1 and 2, the panel 10 is suitably apertured at 16 by any desired means, the aperture being illustrated as a round hole of a convenient diameter. The aperture 16 is adapted to receive the boss 12, which is preferably in the form of cylindrical closed ended protuberance or projection of a diameter somewhat less than that of the aperture 16, and is formed by a suitable tool capable of pressing or displacing the metal out of the plane of the panel so that the metal is projected uniformly. The length or height of the boss 12 is initially substantially greater than the combined thickness of the panels 19 and 11, so that sufficient material is provided for the head 14. From the foregoing it will be noted that the initial steps in preparing the panels for subsequent interconnection comprise providing an aperture in one of the panels, forming a cylindrical boss of substantial length in the other panel, the boss having a diameter less than that of the aperture, and subsequently arranging the panels so that the boss 12 projects through the aperture and the adjacent faces of panels 10 and 11 are substantially flush or in close contact.

The panels are held in such relation and the head 14 formed in the outer or closed end of the boss 12 by flattening the boss into clinching engagement with the outer face of the panel 10 so as to simulate the end of a rivet. The clinching operation not only flattens the boss 12 by providing a generally flat disc-like head 14, but also expands the diameter of the body portion at 18 within the aperture 16. The clinching force is such that the inner side 20 of the head impinges upon the outer face of the apertured panel sufficiently to bite into the panel or become partially embedded therein, forming an annular groove at 22 in the panel adjacent the aperture. Thus, the wall of the aperture as well as the outer surface of the panel adjacent the aperture are firmly gripped by the formation of the head on the boss. During such operation the central portion of the head 14 is depressed or dished at 24 to further simulate a rivet end that has been clinched or set by a suitable tool or machine.

Accordingly, means are provided in a pair of elements whereby they may be securely and rigidly connected together, and wherein extraneous means, such as a nut and bolt assembly or a rivet, is dispensed with, the connection being formed directly in the elements, and when waterproof connections are desired, it will be clear that the present arrangement provides such a connection without the use of additional sealing means.

What I claim is:

A device for connecting a pair of substantially flat metal panels in face to face juxtaposed relation, one of said panels having an aperture, said device comprising a tube-like imperforate boss integral with and projecting at substantially right angles from the other panel through said aperture, a disc-like head formed on said boss with the sides thereof pressed into intimate sealing engagement with the outer side of said other panel for effecting a substantially water-tight joint, and the side of said boss being expanded laterally within said aperture.

HAROLD W. KOST.